(12) United States Patent
Ritchey et al.

(10) Patent No.: US 9,910,542 B2
(45) Date of Patent: Mar. 6, 2018

(54) TOUCH LOCATION CORRECTION FOR TOUCHSCREEN DEVICES

(71) Applicant: Adonit Co., Ltd., Taipei (TW)

(72) Inventors: Timothy David Ritchey, Muncie, IN (US); Jonathan Arbogast, Henrietta, NY (US); Ian Everett Busch, Grand Rapids, MI (US); Shane O'Donnell, Grand Rapids, MI (US)

(73) Assignee: Adonit Co., Ltd., Taipei (TW)

( * ) Notice: Subject to any disclaimer, the term of this patent is extended or adjusted under 35 U.S.C. 154(b) by 88 days.

(21) Appl. No.: 14/985,367

(22) Filed: Dec. 30, 2015

(65) Prior Publication Data

US 2016/0357339 A1 Dec. 8, 2016

Related U.S. Application Data

(60) Provisional application No. 62/097,585, filed on Dec. 30, 2014.

(51) Int. Cl.
*G06F 3/041* (2006.01)
*G06F 3/044* (2006.01)
*G06F 3/0354* (2013.01)

(52) U.S. Cl.
CPC ........ *G06F 3/0418* (2013.01); *G06F 3/03545* (2013.01); *G06F 3/041* (2013.01); *G06F 3/044* (2013.01); *G06F 3/0412* (2013.01)

(58) Field of Classification Search
CPC .... G06F 3/0418; G06F 3/03545; G06F 3/041; G06F 3/0412; G06F 3/044
See application file for complete search history.

(56) References Cited

U.S. PATENT DOCUMENTS

| | | | |
|---|---|---|---|
| 8,836,657 B2* | 9/2014 | Yamamoto | G06F 3/0418 178/18.02 |
| 2013/0278550 A1* | 10/2013 | Westhues | G06F 3/03545 345/174 |
| 2013/0321318 A1* | 12/2013 | Okano | G06F 3/044 345/173 |
| 2015/0220210 A1* | 8/2015 | Sturdevant | G06F 3/0418 345/178 |
| 2015/0309646 A1* | 10/2015 | Nishida | G06F 3/044 345/174 |
| 2015/0338932 A1* | 11/2015 | Pant | G06F 3/03545 345/174 |

\* cited by examiner

*Primary Examiner* — Jennifer Mehmood
*Assistant Examiner* — Sardis F Azongha

(57) ABSTRACT

Methods, systems, and computer readable media are disclosed having methods for correcting a location of a touch sensed by a capacitive touch screen when using a stylus, especially an active electronic stylus. The various corrector methods correct touch locations such as manufacturer's built-in offset designed for fingertips, touchscreen drive/sense electrode banding, stylus angle offset, parallax, long linear stroke smoothing, and/or loop smoothing. The corrector methods used may depend on the stylus model and/or the tablet model detected. The corrector methods may configure themselves to conform to the stylus model and/or tablet model detected.

18 Claims, 11 Drawing Sheets

TOUCH LOCATION CORRECTION FOR TOUCHSCREEN DEVICES

CROSS REFERENCE TO RELATED APPLICATIONS

This application claims the benefit of priority to U.S. provisional patent application No. 62/097,585, filed Dec. 30, 2014, and entitled "TOUCH LOCATION CORRECTION FOR TOUCHSCREEN DEVICES", the disclosure of which is hereby incorporated by reference in its entirety.

FIELD OF THE DISCLOSURE

The present invention relates to correcting the location of a touch on a touchscreen, and more specifically to correcting the location of a touch generated by a stylus on a touchscreen device.

SUMMARY OF THE PRIOR ART

Touchscreen devices using capacitive sensing, such as tablet computers and "smartphones", have become popular due to their portability. By eliminating the keyboard and mouse, and using highly customized operating systems designed around touch-based, or "gestural", user interfaces, considerable weight and bulk can be saved. Mutual capacitance touchscreens have become the most common type of touchscreen interface. Mutual capacitance touchscreens are capable of sensing multiple simultaneous touches without ambiguity, thereby allowing a greater variety of gestural commands than would be possible with a single touch.

Users often prefer to interact with their touchscreen devices by using a stylus instead of a fingertip. The reasons are varied, and may include a desire not to smear the screen, a need for precision when drawing, or simply familiarity with using a pen or pencil for many years to write and draw on surfaces.

However, touchscreens are generally designed for use with fingers and hence for being touched by something having the properties of fingertips, and so touchscreens interact less well in some ways with styluses. The location indicated by a fingertip is imprecise; the contact happens over a large area, different individuals have differently sized and shaped fingertips, they use different pressures, and so on. Gestural interfaces are designed to compensate for this imprecision by using large controls; moreover, because users expect the touch location to be projected from their fingertip, touch system software and/or device firmware apply a generic correction factor based upon human factors specialists' evaluations of what the average user expects and on how the average user's contact with the touchscreen appears to the sensor.

Furthermore, active electronic styluses generate electrostatic forces that affect touchscreen hardware differently than fingertips. Error is caused by two separate issues, sense line saturation and drive line signal detection. Active electronic styluses receive the drive line signal from a relatively small area, and so the signal detected is relatively consistent ("flat"); they then amplify and return the signal to the sense lines at a much higher level, which saturates the hardware that is coupled to the sense line. The result is that the touchscreen hardware detects a touch at the wrong position.

As a result, touchscreens do not optimally locate the touch generated by a stylus, especially styluses using active electronics. Improvements in touch location correction for touchscreen devices are therefore desirable.

SUMMARY OF CERTAIN EMBODIMENTS

Embodiments are disclosed that use one or more correctors to correct touch location.

The correctors may include one or more of: correcting for the built-in fingertip offset correction of the device, correcting for the touch sensor electrode bands distortion, correcting for the angle of the stylus relative to the touchscreen, correcting for the stylus holding style of the user, and/or correcting for parallax resulting from the stacked sensor and screen. In various embodiments, one or more correctors may have order dependencies, and/or one or more correctors may not be order-dependent.

DESCRIPTION OF THE EMBODIMENTS

Figure 1A:
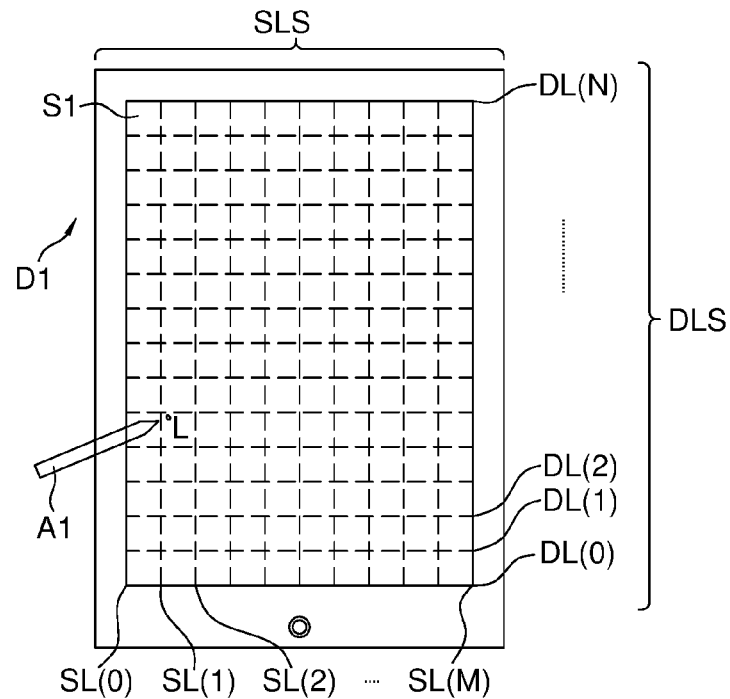
FIG. 1A is a diagram of a stylus interacting with a touchscreen device in accordance with some embodiments.

The following detailed description of embodiments references the accompanying drawings that form a part hereof, in which are shown various illustrative embodiments through which the invention may be practiced. In the drawings, like reference numbers indicate like features or functionally identical steps. The embodiments are described in sufficient detail to enable those skilled in the art to practice the invention, and it is to be understood that other embodiments may be utilized and that logical changes may be made without departing from the spirit and scope of the invention. The detailed description is therefore not to be taken in a limiting sense, and the scope of the invention is defined solely by the appended claims.

Figure 1B:
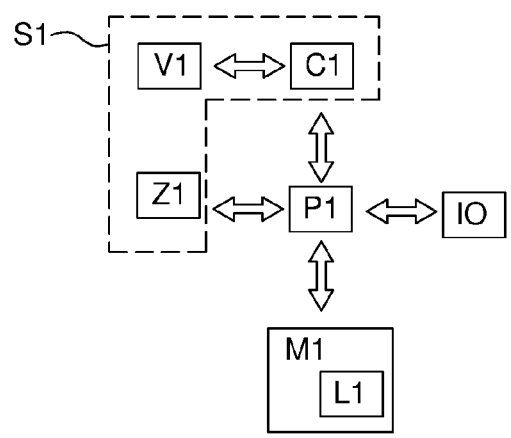
FIG. 1B is a block diagram of a touchscreen device in accordance with some embodiments.

Please refer now to FIG. 1A, a diagram of a stylus interacting with a touchscreen device in accordance with some embodiments, in combination with FIG. 1B, a block diagram of a touchscreen device in accordance with some embodiments.

The mutual capacitance sensors for such touchscreen devices are typically designed around the use of human fingertips as the source of the touches. The sensors are designed to sense a touch across a relatively large area—the size of a human fingertip—and with a relatively large capacitance so that, for example, water droplets or other contaminants on the sensor surface can be ignored as noise.

Mutual capacitance sensors use a grid of electrodes composed of a set of nonintersecting sense electrodes and a set of nonintersecting drive electrodes, the sense electrodes and drive electrodes typically arranged such that each set is formed of parallel straight lines and the two sets are oriented orthogonally to each other with a dielectric (for example without limitation, glass, polymer, or sapphire) between the two sets, with one set of electrodes aligned with the rows of pixels of the display screen and the other set of electrodes aligned with the columns of pixels of the display screen. From the hardware perspective, either set of electrodes may be chosen as the row electrodes with the other set being the column electrodes; touchscreen devices typically can be held in any orientation, so that from the user's perspective, the two are sometimes horizontal or "row" electrodes and sometimes vertical or "column" electrodes; however, from the hardware perspective, the orientation is generally fixed, and the user-perspective view is merely a mapping. Each set of lines is typically spaced approximately equidistantly amongst its set. Note that although this Cartesian grid arrangement is typical (because it is logically organized and thus straightforward to work with), it is not required; the two sets of electrodes could be arranged in a polar-grid pattern, or in swirls and squiggles, or in any other pattern that might work well for a given device. The Cartesian grid, aligned with the display, is merely a convenience, albeit a very significant one. Wherever a sense electrode (such as SL(2) or any other sense electrode of SLS) crosses a drive electrode (such as DL(1) or any other drive electrode of DLS) with dielectric between them, the node forms a capacitor, and the touchscreen controller merely needs to know the relative locations of the nodes in order to calculate the positions of detected touches relative to the associated display screen.

The touchscreen controller reads the charging times of these capacitors to determine when something with a large electrical charge capacity is in proximity; a reduced charge on or longer charging time for a capacitor at a node indicates proximity of something that is absorbing part of the charge, such as a fingertip contacting the touchscreen near the intersection. When the touchscreen controller detects this type of interference over a sufficiently large region, with a sufficiently large effect, the controller firmware generates a touch event and sends it to the touchscreen device, including certain parameters of the touch such as size and location (in some cases given as a centroid of the contact).

The touchscreen device D1 has a touchscreen S1, a processor P1, input-output (I/O) devices IO and a nontransitory memory M1 (a nontransitory computer-readable medium) on which a program including logic L1 implementing an embodiment of a touch location correction method 30 or 30' is stored (typically along with other files and programs). The touchscreen S1 comprises a touch sensor controller C1, a capacitive touch sensor Z1, and a video display V1. The capacitive touch sensor Z1 has a plurality of sense electrodes SL(0) . . . SL(M) (referenced collectively as SLS) and a plurality of drive electrodes DL(0) . . . DL(N) (referenced collectively as DLS), all of which are controlled and monitored by the touch sensor controller C1. The touch sensor controller C1 and video display V1 are each operatively coupled to the processor P1; the processor P1 receives touch input data from touch sensor controller C1, and the processor P1 controls output to the video display V1. Processor P1 is a central processing unit, microcontroller, or similar physical hardware device, as are well known to persons having ordinary skill in the art. Memory M1 is operatively coupled to the processor P1 and stores logic and data which may be read and/or executed by processor P1. Memory M1 may be flash memory, a SSD, a disk drive, or similar nontransitory storage used for saving data, such as programs and files, even when the device is turned off. I/O controller IO is operatively coupled to the processor P1 and may control various additional input and/or output devices. Also shown is a stylus A1 interacting with the touchscreen S1 to produce a sensed contact or "touch" L that is detected by the touch sensor controller C1 and has logic L1 applied to L to correct the location of L.

The drive electrodes DLS are spaced apart in parallel with an axis of the touchscreen S1. The sense electrodes SLS are spaced apart in parallel with the other axis of the touchscreen S1, and in embodiments where S1 is rectangular are orthogonal to the drive electrodes. The drive electrodes DLS are spaced approximately equidistantly from each other. Likewise, the sense electrodes SLS are spaced approximately equidistantly from each other.

Further describing the touchscreen device D1, it may correspond to a personal computer system, such as a desktop, laptop, tablet or handheld computer, cell phone, PDA, dedicated media player, consumer electronic device, and the like.

The touchscreen device D1 shown in FIG. 1B includes processor P1 configured to execute instructions and to carry out operations associated with the touchscreen device D1. For example, using instructions retrieved for example from memory, the processor P1 may control the reception and manipulation of input and output data between components of the touchscreen device D1. Processor P1 may be implemented on a single chip, multiple chips or multiple electrical components, and may comprise one or more cores and/or one or more processors. For example, various architectures can be used for the processor P1, including dedicated or embedded processor, single purpose processor, microcontroller, ASIC, graphics processor, and so forth.

The processor P1 together with an operating system operates to execute computer code and produce and use data. Operating systems are generally well known in the art. For example without limitation, the operating system may be Unix, Linux, Palm OS, iOS, Android, and the like. The operating system can also be a special purpose operating system, such as may be used for limited purpose appliance-type computing devices. The operating system, other computer code and data (such as logic L1 using embodiments of the present disclosure) may reside within a memory M1 that is operatively coupled to the processor P1. Memory M1 generally provides a place to store logic, logic being defined herein as computer instructions and data, that are used by the touchscreen device D1. For example without limitation, the memory M1 may include Read-Only Memory (ROM), Random-Access Memory (RAM), flash memory, solid-state drive (SSD), hard disk drive, optical drive such as CD or DVD, and/or the like, including combinations thereof. The logic could also reside on a removable storage medium and be loaded or installed onto the touchscreen device D1 as needed. Removable storage mediums include, for example, CD-ROM, PC-CARD, memory card, floppy disk, magnetic tape, flash memory such as SD card or micro-SD card or USB flash drive, cloud storage, and a network component.

The touchscreen device D1 also includes a touchscreen S1 that is operatively coupled to the processor P1. The touchscreen S1 comprises a video display V1 which may for example without limitation correspond to a liquid crystal display (LCD) (e.g., active matrix, passive matrix and the like), a monitor such as a monochrome display, color graphics adapter (CGA) display, enhanced graphics adapter (EGA) display, variable-graphics-array (VGA) display, super VGA display, cathode ray tube (CRT), and the like, or a plasma display or a display implemented with electronic inks.

The touchscreen S1 is generally configured to display a graphical user interface (GUI) that provides an easy to use interface between a user of the computer system and the operating system or application running thereon. Generally speaking, the GUI represents, programs, files and operational options with graphical images. The graphical images may include windows, fields, dialog boxes, menus, icons, buttons, cursors, scroll bars, etc. Such images may be arranged in predefined layouts, or may be created dynamically to serve the specific actions being taken by a user. During operation, the user can select and activate various graphical images in order to initiate functions and tasks associated therewith. By way of example, a user may select a button that opens, closes, minimizes, or maximizes a window, or an icon that launches a particular program. The GUI can additionally or alternatively display information, such as non-interactive text and graphics, for the user on the touchscreen S1.

In some embodiments, the touchscreen S1 also comprises a capacitive touch sensor Z1 that is operatively coupled to a touch sensor controller C1. The capacitive touch sensor Z1 is configured to transfer data from the outside world into the touchscreen device D1. The capacitive touch sensor Z1 may for example be used to perform tracking and to make selections with respect to the GUI on the touchscreen S1. The capacitive touch sensor Z1 may also be used to issue commands in the touchscreen device D1. The capacitive touch sensor Z1 is a touch sensing device configured to receive input from a user's touch and to send this information to the touch sensor controller C1. In some alternate embodiments, the capacitive touch sensor Z1 may instead correspond to a touchpad external to the touchscreen S1. In many cases, the touch-sensing device recognizes touches, as well as the position and magnitude of touches on a touch sensitive surface. In some embodiments, the capacitive touch sensor Z1 and touch sensor controller C1 report the touches to the processor P1 and the processor P1 interprets the touches in accordance with its programming. For example, the processor P1 may initiate a task in accordance with a particular touch. A dedicated processor such as touch sensor controller C1 can be used to process touches locally and reduce demand for the main processor of the computer system. Some embodiments may not use a touch sensor controller C1, in which case the capacitive touch sensor Z1 may be operatively coupled directly to the processor P1 The touch sensing device may be based on sensing technologies including but not limited to self-capacitive sensing, mutual capacitance sensing, and the like. Furthermore, the touch sensing means may be based on single point sensing or multipoint sensing. Single point sensing is capable of only distinguishing a single touch, while multipoint sensing is capable of distinguishing multiple touches that occur at the same time.

The capacitive touch sensor Z1 may be a touch screen that is positioned over or in front of the display S1. The capacitive touch sensor Z1 may be integrated with the display device S1 or it may be a separate component such as a touchpad.

The touchscreen device D1 also includes capabilities for coupling to one or more I/O devices IO. By way of example, the I/O devices IO may correspond to keyboards, printers, scanners, cameras, speakers, and/or the like. The I/O devices IO may be integrated with the touchscreen device D1 or they may be separate components (e.g., peripheral devices). In some cases, the I/O devices IO may be connected to the touchscreen device D1 through wired connections (e.g., cables/ports). In other cases, the I/O devices IO may be connected to the touchscreen device D1 through wireless connections. By way of example, the wireless connections may correspond to IR, RF, WiFi, Bluetooth, wireless USB or the like.

In accordance with one embodiment of the present invention, the touchscreen device D1 is designed to recognize gestures applied to the capacitive touch sensor Z1 and to control aspects of the touchscreen device D1 based on the gestures. In some cases, a gesture is defined as a stylized interaction with an input device that is mapped to one or more specific computing operations. The gestures may be made through various hand, and more particularly finger motions. Alternatively or additionally, the gestures may be made with a stylus. In all of these cases, the capacitive touch sensor Z1 receives the gestures and the touchscreen device D1 executes logic to carry out operations associated with the gestures, for example without limitation executing the logic using the processor P1. In addition, the memory M1 may include a gesture operational program, which may be part of the operating system or a separate application. The gestural operation program generally includes a set of instructions that recognizes the occurrence of gestures and informs one or more software agents of the gestures and/or what action(s) to take in response to the gestures. In addition, the memory M1 may include logic L1 for touch location correction involving embodiments based upon the present disclosure, which may be part of the operating system or a separate application. The logic L1 includes a set of instructions that receives touch locations and returns corrected locations.

Figure 2:
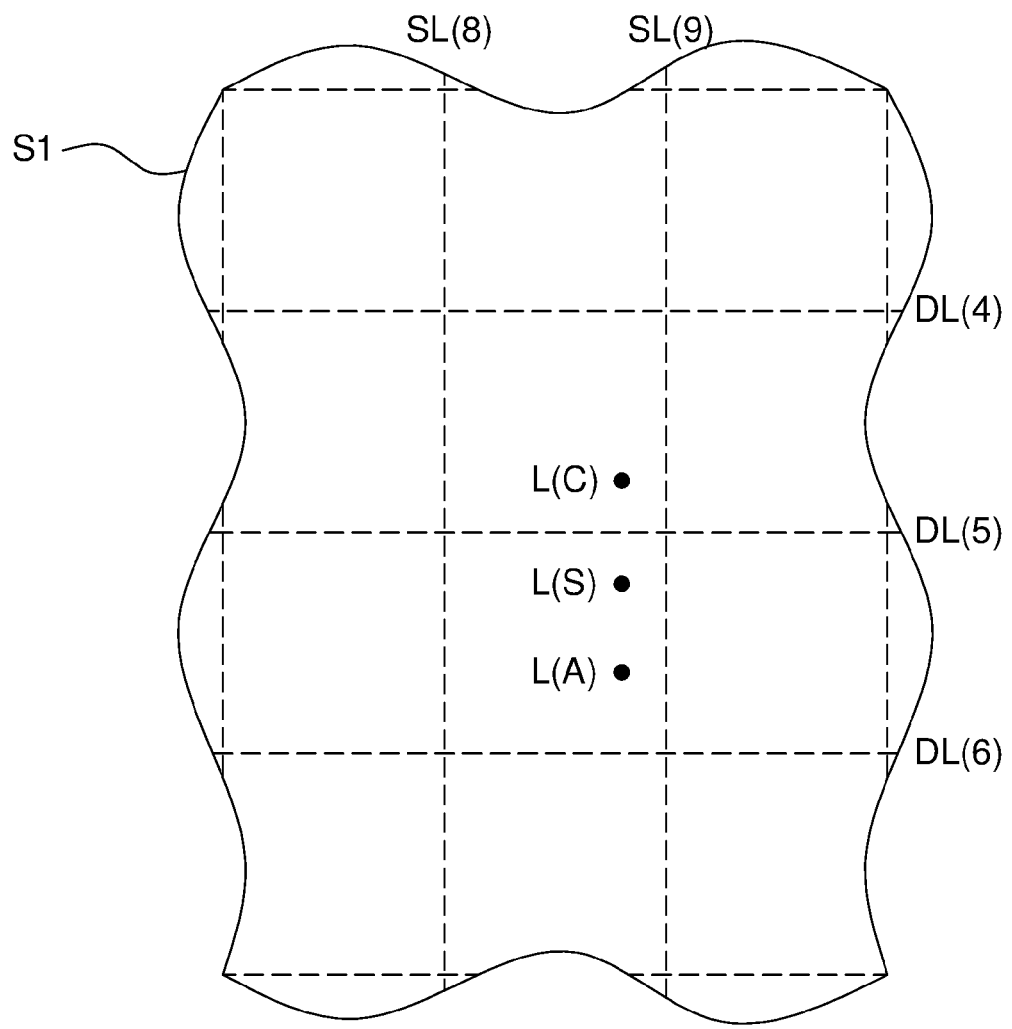
FIG. 2 shows a closeup of a section of a screen of a touchscreen device with certain locations indicated, in accordance with some embodiments.

Refer now to FIG. 2, an illustration of a detected touch by a stylus on a touchscreen. The touchscreen S1 (here showing a portion of video display V1), drive electrodes DL(4), DL(5), and DL(6), sense electrode SL(8) and sense electrode SL(9) (the electrodes being parts of the capacitive touch sensor Z1), and locations L(C), L(A), and L(S) are shown. The stylus (not shown) has suppressed charging of the capacitors formed at the four nodes where the drive electrode DL(5) and drive electrode DL(6) pass by sense electrode SL(8) and sense electrode SL(9), resulting in the touch sensor controller C1 to detect a touch and to assign it to a location based upon the relative charge levels or times of the capacitors that are formed at the nodes of the intersections of sense electrodes and drive electrodes. The touchscreen controller firmware (not shown) corrects the location to the point marked L(C) based upon the built-in correction model (discussed below). The actual location without the built-in correction model being applied is at the point marked L(A). The location being indicated by the stylus A1, however, is at the point marked L(S), the projection of the axis of the stylus through the various layers of the display to the pixels being seen by the user.

The built-in correction model in the firmware of the touch sensor controller C1 is meant to compensate for the shape of the contact patch created by a user's fingertip when the finger is traveling in a given direction on a screen in a particular orientation, and also to compensate for the average user's perception of where the fingertip is pointing when touching the touchscreen. This involves multiple levels of estimation by the device's designers, including guessing how the average user will position his finger, the angle at which the finger will be held when touching the screen, the size and shape of the finger, as well as many more factors.

A stylus creates a more uniform contact patch (or virtual contact patch, if using an active electronic stylus) which does not deform differently depending on direction of movement (e.g., due to friction between a surface of the touchscreen S1 and the user's fingertip pad), and the user's perception of where a stylus is pointing is more precisely determinable.

Figure 3:
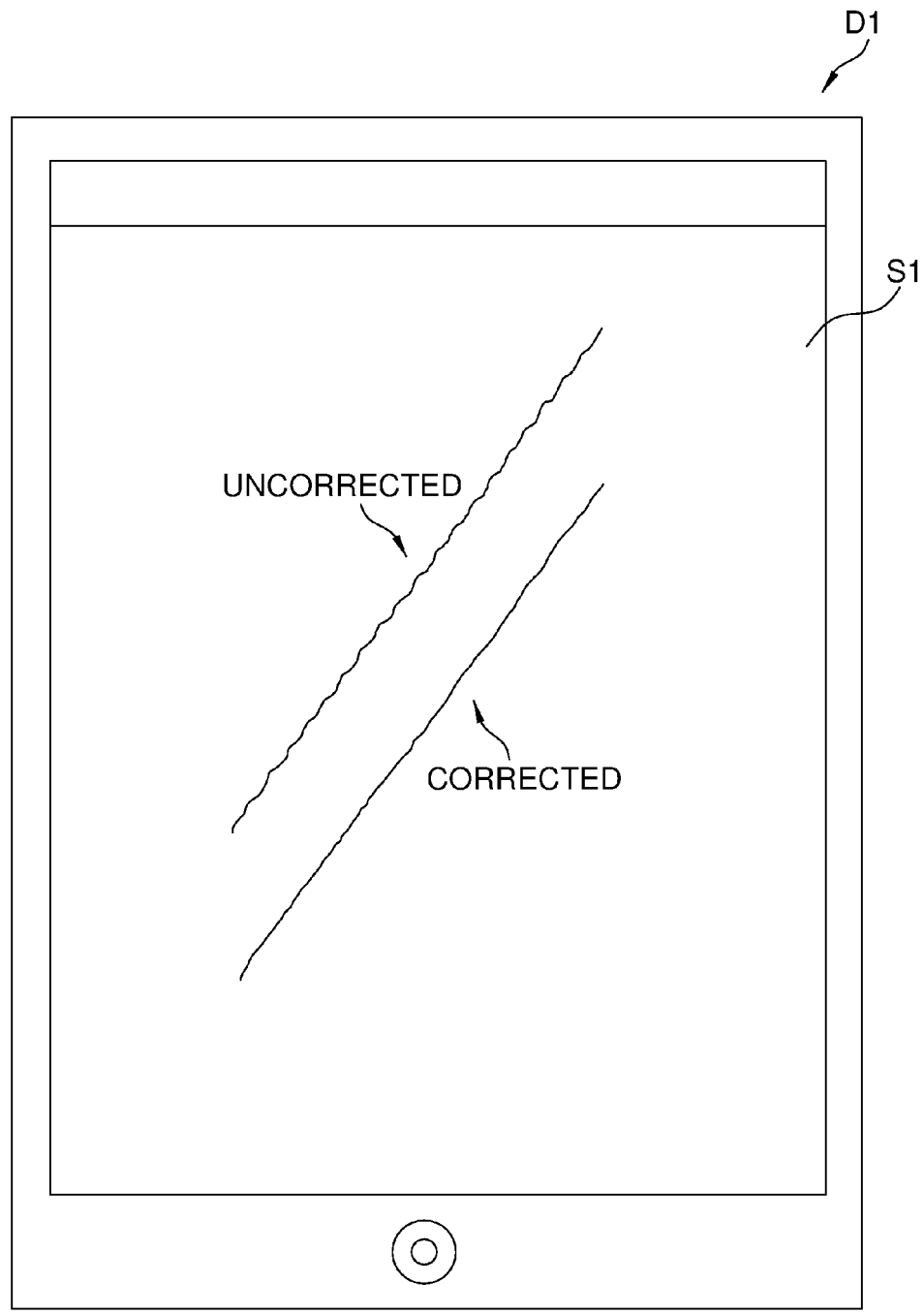
FIG. 3 shows example paths generated on a touchscreen device by an active electronic stylus with and without applying an embodiment of methods for location correction as in the present disclosure.

FIG. 3 shows example paths generated on a touchscreen device by an active electronic stylus with and without applying an embodiment of methods for location correction as in the present disclosure. Touchscreen device D1 displays on touchscreen S1 a path UNCORRECTED drawn as detected and processed by touchscreen device D1 without the use of an embodiment of a method for location correction as disclosed herein, and also a path CORRECTED drawn after applying an embodiment of a method for location correction to the path's locations as detected and processed by touchscreen device D1. The path UNCORRECTED shows a jagged path, or "wavy line effect", in which the touch locations generated by the capacitive touch sensor Z1 and touch sensor controller C1 are noticeably distorted by being pulled up or pulled down toward an electrode. This distortion may be caused by at least two issues: saturation (or oversuppression) of the capacitors in the capacitive touch sensor Z1 by the electric field generated by the stylus, and under-detection by the stylus of the signal generated by the drive lines of the capacitive touch sensor Z1. Unlike a fingertip, which covers a relatively wide area of the screen, typically a distorted oval of around 6 mm at its maximum chord (wide enough to overlap two drive lines), a fine-tip active electronic stylus has a tip of typically under 2 mm diameter.

The result is that lines drawn on the capacitive touch sensor by a stylus tend to be drawn toward drive lines, creating a "banded" effect. If a user were to move the stylus back and forth across the touchscreen S1, the locations reported by the capacitive touch sensor Z1 via the touch sensor controller C1 would, if plotted, create a series of bands across the screen, where the reported locations would cluster around the bands. A cluster analysis of the accumulated location data can be used to pinpoint the centerline of each band of the plurality of bands. Alternately, samples of each device may be torn down and physically examined to find the precise locations of the sense electrodes and drive electrodes, and the band locations may be closely determined from such examination. An advantage of the cluster analysis method is that it may be applied to accumulations of data points from a user's particular touchscreen device, so that an individualized profile for a specific individual touchscreen device may be generated on the fly, such as over time from normal usage of the touchscreen device, thus providing correction for manufacturing tolerances and defects, without the need to tear apart and physically examine the touchscreen device.

Figure 4:
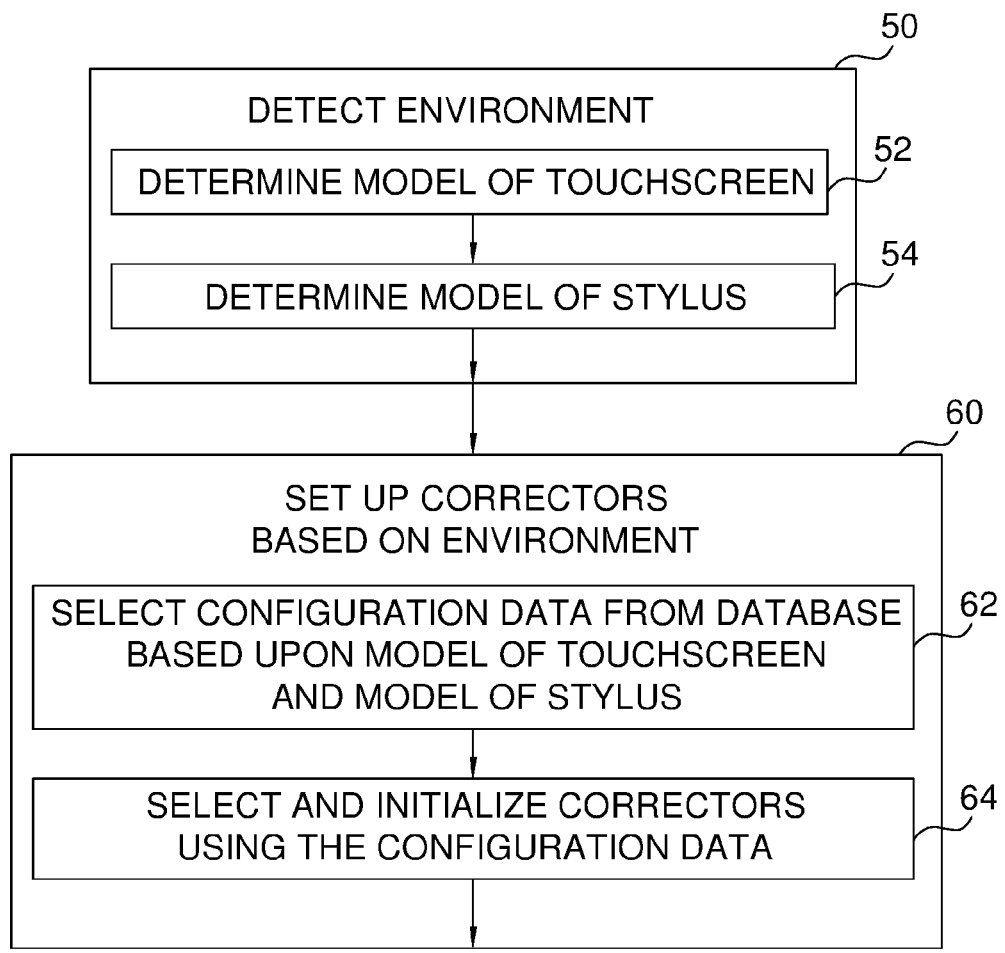
FIG. 4 is a flowchart of initialization for an embodiment of a method for location correction.

Please refer now to FIG. 4, a flowchart of initialization for an embodiment of a method for location correction. At block 50, the method detects what the environment is; this includes block 52, determining the model of touchscreen, and block 54, determining the type of stylus being used; blocks 52 and 54 may be performed in any order; the method then proceeds to block 60. At block 60, the method sets up the correctors; this includes block 62, selecting a set of configuration parameters from a database based upon the detected environment, such as the model of touchscreen and model of stylus, and block 64, choosing and ordering which correctors to apply based upon the configuration parameters and initializing the correctors using the configuration parameters. In some embodiments, block 60 may also set the power level or power range used by the stylus.

The model of touchscreen is generally the same for all individual devices of a particular device model and revision. For a given device model, manufacturers may change the screen from time to time and bring out a new revision of the device model. Knowing the device model and revision (which can be determined by a call to the operating system software on most such devices), the model of touchscreen used in that device can be determined, and the configuration parameters for the method can be selected from a database of many sets of configuration parameters, one or more sets of configuration parameters per device for which the method is to be used.

However, also important is how the particular stylus model interacts with a given touchscreen model. A stylus may be designed to work with many models of touchscreens, but different power settings and electrode selections (for active styluses) may improve the stylus-touchscreen interaction; in particular, the stylus' power setting may be used to reduce the saturation effect on the sense electrodes—when a given model of touchscreen is more sensitive to a given model of stylus, lower voltage and/or amperage may be used by the stylus, thereby causing less charge suppression to occur and reducing the banding distortion or "wavy line effect". Consequently, where more than one model of stylus is being supported by the method, the stylus model may also be used as a selection parameter for selecting the configuration parameters from the database. There may be only one set of configuration parameters for multiple stylus models, or one or more stylus models may require different sets of configuration parameters.

The setup may be done when a stylus is associated with the touchscreen device, for example without limitation when using Bluetooth pairing to set up communications between a Bluetooth-enabled stylus and a touchscreen device, or may be done by user command, for example without limitation when starting a graphics program and using its menu to indicate to the graphics program that the user is using a stylus.

Figure 5A:
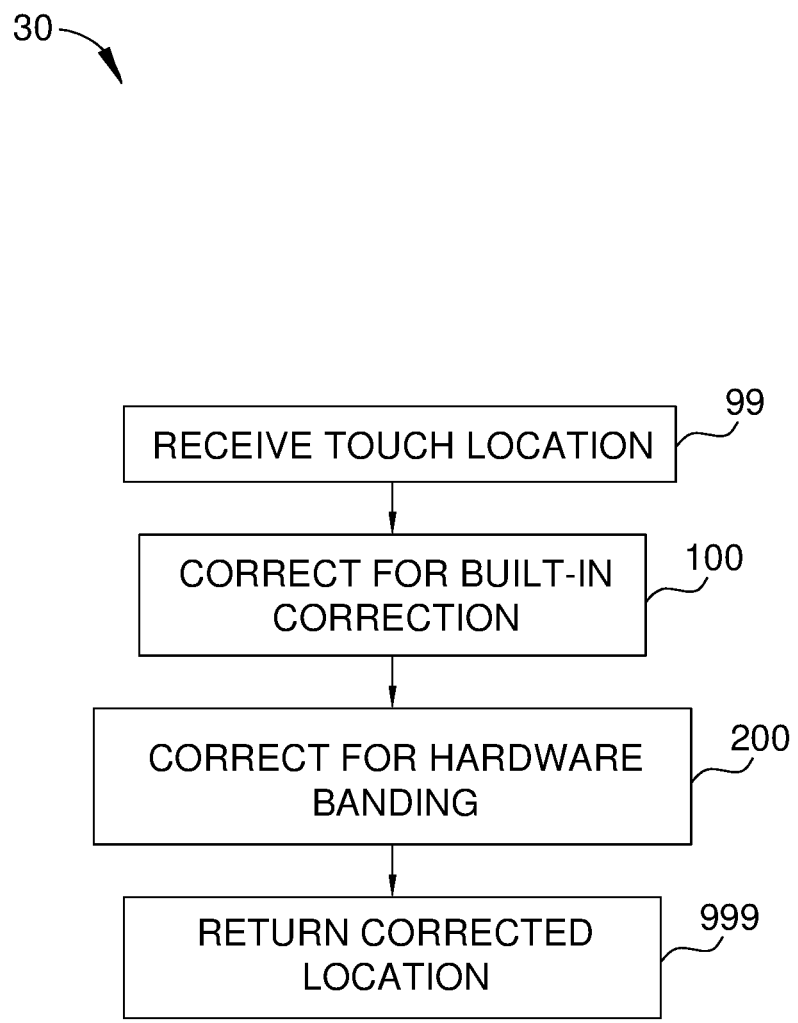
FIG. 5A is a flowchart of an embodiment of a method for location correction.

FIG. 5A shows a flowchart of an embodiment of a method for location correction. Each time a touch location is received, the method 30 is called. At block 99, a touch location is received by the method, and the method proceeds to block 100. At block 100, the built-in offset correction performed by the firmware is determined and subtracted from the reported location to estimate an as-detected location, and the method proceeds to block 200. At block 200, hardware banding correction is applied to the as-detected location, and the method proceeds to block 999. At block 999, the corrected location is returned; alternately, in some embodiments, the relative offset for correction may be returned, or in some embodiments both the corrected location and the overall correction may be returned.

Figure 5B:
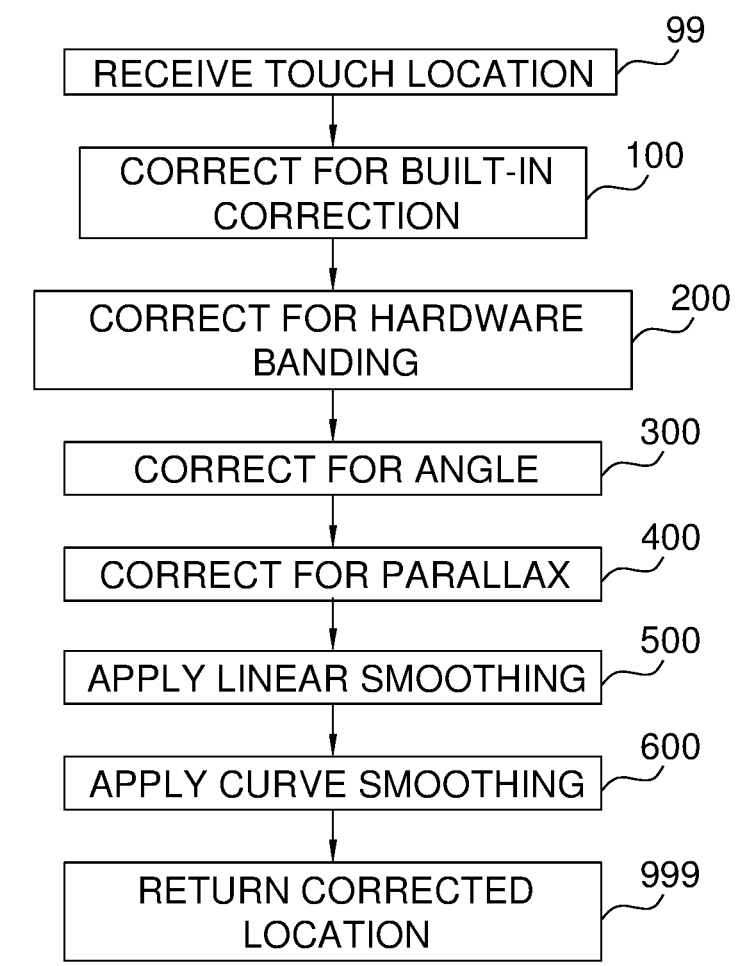
FIG. 5B is a flowchart of an embodiment of a method for location correction.

FIG. 5B shows a flowchart of an embodiment of a method for location correction. The method 30' comprises additional blocks compared to the method 30; blocks 300, 400, 500, and 600 are various additional correctors that may be applied to further refine the location correction. After the banding correction 200 in block 200, the method proceeds to block 300. In block 300, the corrector refines the location according to the relative angle between the stylus and the touchscreen device to place the location in alignment with the axis of the stylus. This method may use accelerometers in the stylus and in the touchscreen device to determine relative positions, determine an angle between them, and use trigonometry and geometry to determine a more accurate touch location. The method may also, for active electronic styluses, use the shape and/or size and/or detected power level of the electrostatic field generated by the stylus, as well as the detected power level and timing of the drive line signals from the touchscreen device as detected by the stylus' active electronics to determine the angle between the stylus and the touchscreen device. After performing block 300, the method continues at block 400.

Block 400 determines a correction for parallax and applies it to the touch location. The correction may, for example, be determined by using a camera in the touchscreen device to image the field of view from the device, use facial recognition to find the location of the user's eyes, estimate distance to the user, and use trigonometric and geometric methods to generate a parallax correction based upon the distance to the user and the angle between the touchscreen of the touchscreen device and the eyes of the user. The method may further take into account the user's eye dominance based upon user-entered settings and/or population statistics. After performing block 400, the method proceeds to block 500.

In block 500, the method 30' applies linear smoothing to the touch location. When the user is drawing a line that is straight within a first arbitrary limit, and the line segment extends longer than a second arbitrary limit, the location is adjusted to remain close to a line with a slope and position of the previous segments drawn. After performing block 500, the method proceeds to block 600.

In block 600, the method 30' applies velocity-based curve smoothing to the location. Where a segment is short and its velocity vector is within a first arbitrary limit of a previously drawn segment, a correction is applied to smooth the path that is being generated. After performing block 600, the method proceeds to block 999.

The various correctors of method 30' may be applied in different orders, may be turned off or on by the user through a settings control panel, and may depend on the results from prior correctors or may be applied independent of the results from prior correctors. Additional correctors may be applied, and may or may not have order dependencies. In some embodiments, the built-in location correction method 100 and banding correction 200 are applied first to remove hardware effects before user-perception correctors and/or smoothing correctors are applied. In some embodiments, not all of the correctors are performed.

Figure 6:
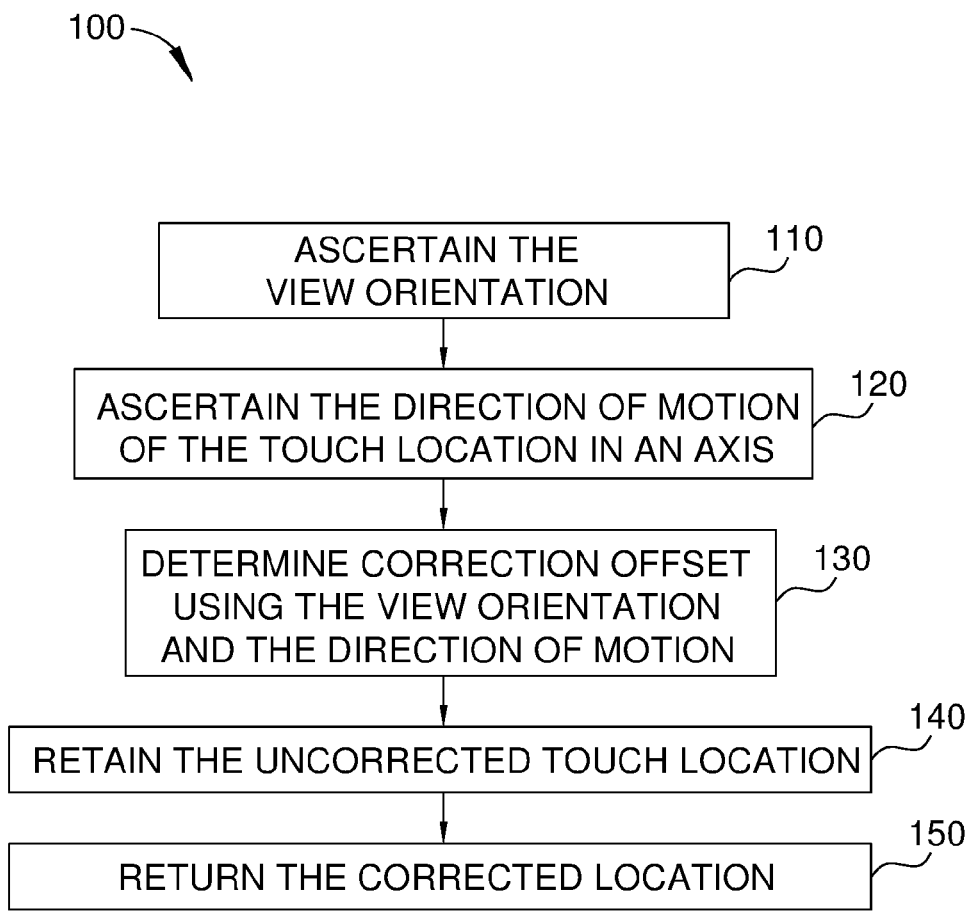
FIG. 6 is a flowchart of an embodiment of a corrector method for removing built-in offset.

FIG. 6 is a flowchart of an embodiment of a corrector method for removing built-in offset, the method of block 100 of FIG. 5A and FIG. 5B. In block 110, the current screen orientation is ascertained. There are four possible orientations: portrait orientation, landscape-left orientation, upside-down portrait orientation, and landscape-right orientation; on some touchscreen devices, the orientation is automatically adjusted whenever built-in accelerometer sensors indicate that the angle of the device relative to the Earth's gravitational pull ("down") has changed; this auto-rotation may be changed by user preference settings. After performing block 110, the method proceeds to block 120. In block 120, the direction of motion in the relevant axis is ascertained; for example, in some embodiments, the Y coordinate of the current location is compared to the Y coordinate of the previous location to ascertain the direction of travel of the touch. After performing block 120, the method proceeds to block 130. In block 130, the correction is determined based upon at least the two factors consisting of the screen orientation and the direction of travel; in embodiments with no additional factors, this results in eight possible corrections, two (by directionality) for each of the four possible orientations. In some embodiments, other factors may be used in addition to or in place of one or more of these factors, for example without limitation the absolute location on the screen may be another factor in determining the correction. In some embodiments, the correction is looked up in a table. After performing block 130, the method proceeds to block 140. In block 140, the current uncorrected location is retained, for example being saved in a static variable storage location as the previous location, for use the next time the method is called. After performing block 140, the method proceeds to block 150. In block 150, in some embodiments the corrected location is returned; in some embodiments, the correction relative offset is returned.

In some embodiments, removal of the built-in correction is performed first before all other correction filters, as some other correction filters are dependent on the estimated true position of the point on the screen.

Note that in some device environments, the coordinates of a location are reported in an absolute format, i.e., location is based upon a fixed physical corner of the touchscreen; whereas in other device environments, the coordinates of a location are reported in a relative format, i.e., location is reported relative to any one of the four corners of the screen depending upon the orientation of the screen at the time the location is reported.

In some embodiments, the screen coordinates are converted from relative format to absolute format before applying the correction factor. In some embodiments, the correction factor is applied before converting the screen coordinates from relative format to absolute format.

Figure 7:
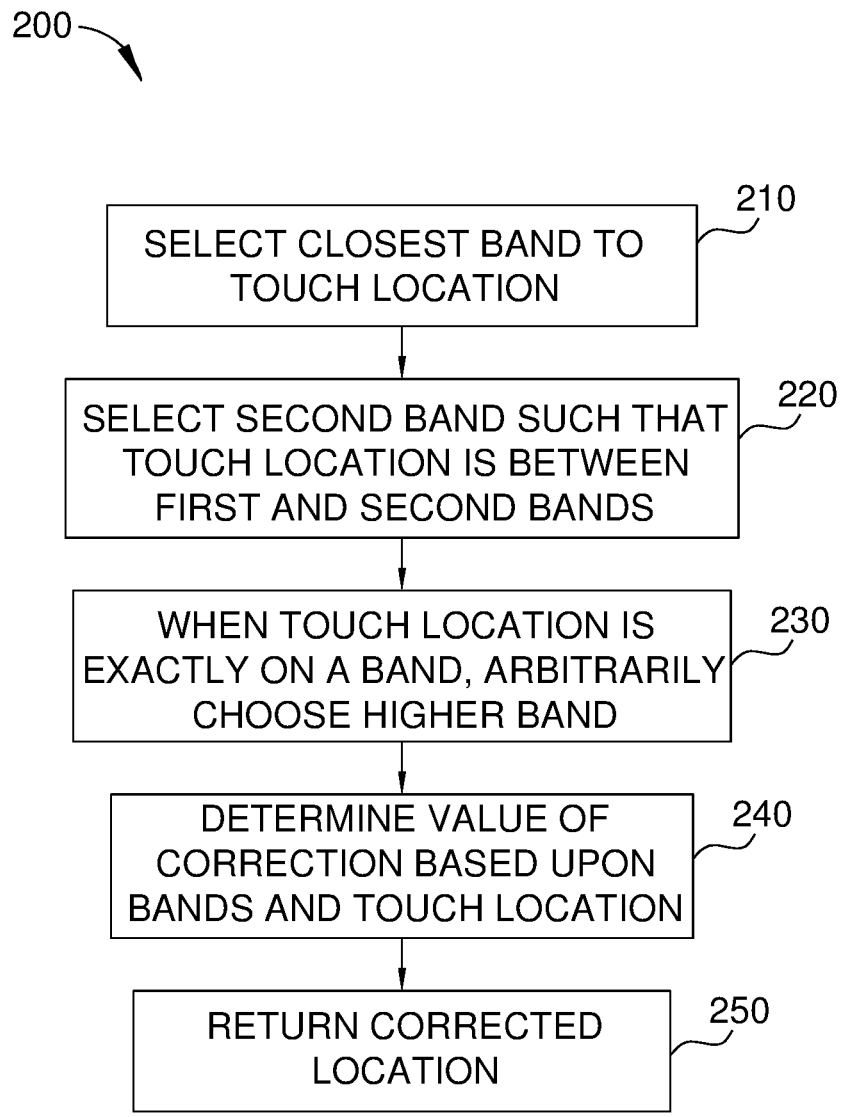
FIG. 7 is a flowchart of an embodiment of a corrector method for screen banding location correction.

Please refer now to FIG. 7, a flowchart of an embodiment of a corrector method for screen banding location correction, in conjunction with FIGS. 9A-D, four diagrams illustrating the possible relative positions of a touch location and its nearest bands in an embodiment of a corrector method for screen banding location correction.

Figure 9A:
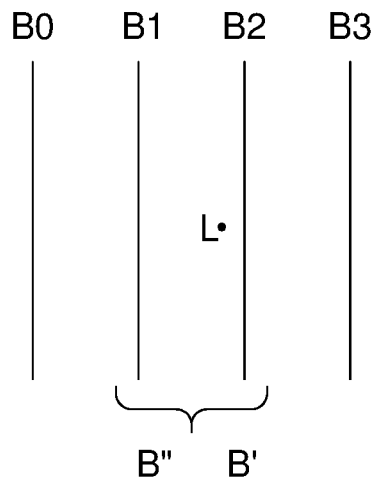
FIGS. 9A, 9B, 9C, and 9D are diagrams illustrating the possible relative positions of a touch location and its nearest bands in an embodiment of a corrector method for screen banding location correction.
Figure 9B:
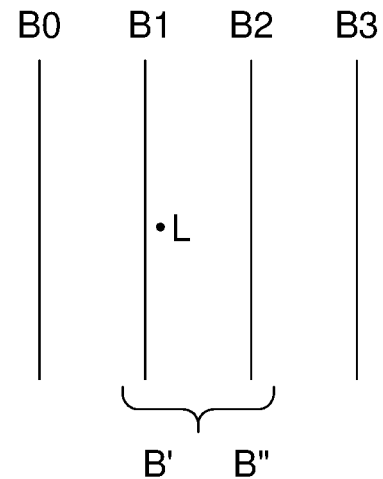
Figure 9C:
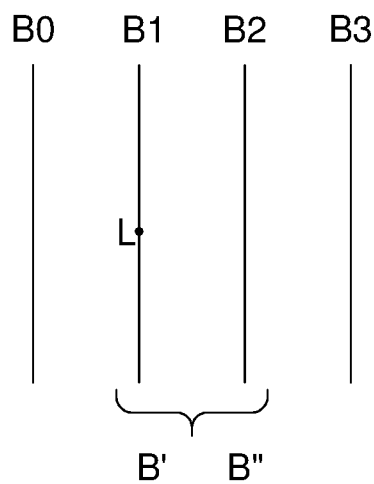
Figure 9D:
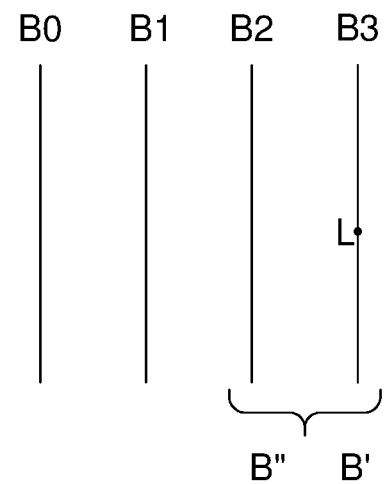

First, please view FIGS. 9A-D, which show the possibilities that are evaluated at block 210 and block 220 of FIG. 7. These four figures show a simple example using four bands, B0 B1 B2 and B3, a location L along whichever axis corresponds to the correction (either the X coordinate or the Y coordinate, chosen according to which axis needs the banding correction applied), and the resulting chosen closest band B' and second-closest band B". In FIG. 9A, location L is positioned between band B1 and band B2, and location L is closer to band B2. As a result, band B2 is selected as the closest band B' in block 210, and band B1 is selected as the second-closest band B" in block 220. In FIG. 9B, location L is positioned between band B1 and band B2, and location L is closer to band B1. As a result, band B1 is selected as the closest band B' in block 210, and band B2 is selected as the second-closest band B" in block 220. In FIG. 9C, location L is positioned exactly on band B1. As a result, band B1 is selected as the closest band B' in block 210, and band B2 is selected as the second-closest band B" in block 220. In FIG. 9D, location L is positioned exactly on band B3. As a result, band B3 is selected as the closest band B' in block 210, and band B2 is selected as the second-closest band B" in block 220. Regarding FIG. 9C and FIG. 9D, note that if a location is exactly on a band, the method may choose either a next-higher band or a next-lower band; in some embodiments, the method always selects the next-higher band; in some embodiments, the method always selects the next-lower band; in some embodiments, either the next-higher band or next-lower band may be selected. Note also that edge effects must be handled; if a location is exactly on the highest band or exactly on the lowest band, in some embodiments the next-closest band selected is the second-highest or second-lowest respectively, or in some embodiments the method treats the location as a special case.

Referring now to FIG. 7, at block 210, the method determines the closest band to the location, and the method proceeds to block 220. At block 220, the next-closest band is determined, which will be either one higher or one lower than the closest band; if the location is exactly on a band, then the method may for example arbitrarily always choose the next-highest band. After determining the next-closest band in block 220, the method proceeds to block 230. At block 230, the direction to the closest band is determined; in some embodiments, when the nearest band has a location value less than the location then the direction is set to +1.0, else the direction is set to −1.0. At block 240, the correction is determined; in some embodiments, the correction is applied to the location. After completing block 240, the method proceeds to block 250. At block 250, in some embodiments, the corrected location is returned; in some embodiments, the correction is returned; in some embodiments, both the corrected location and the correction are returned.

Figure 8:
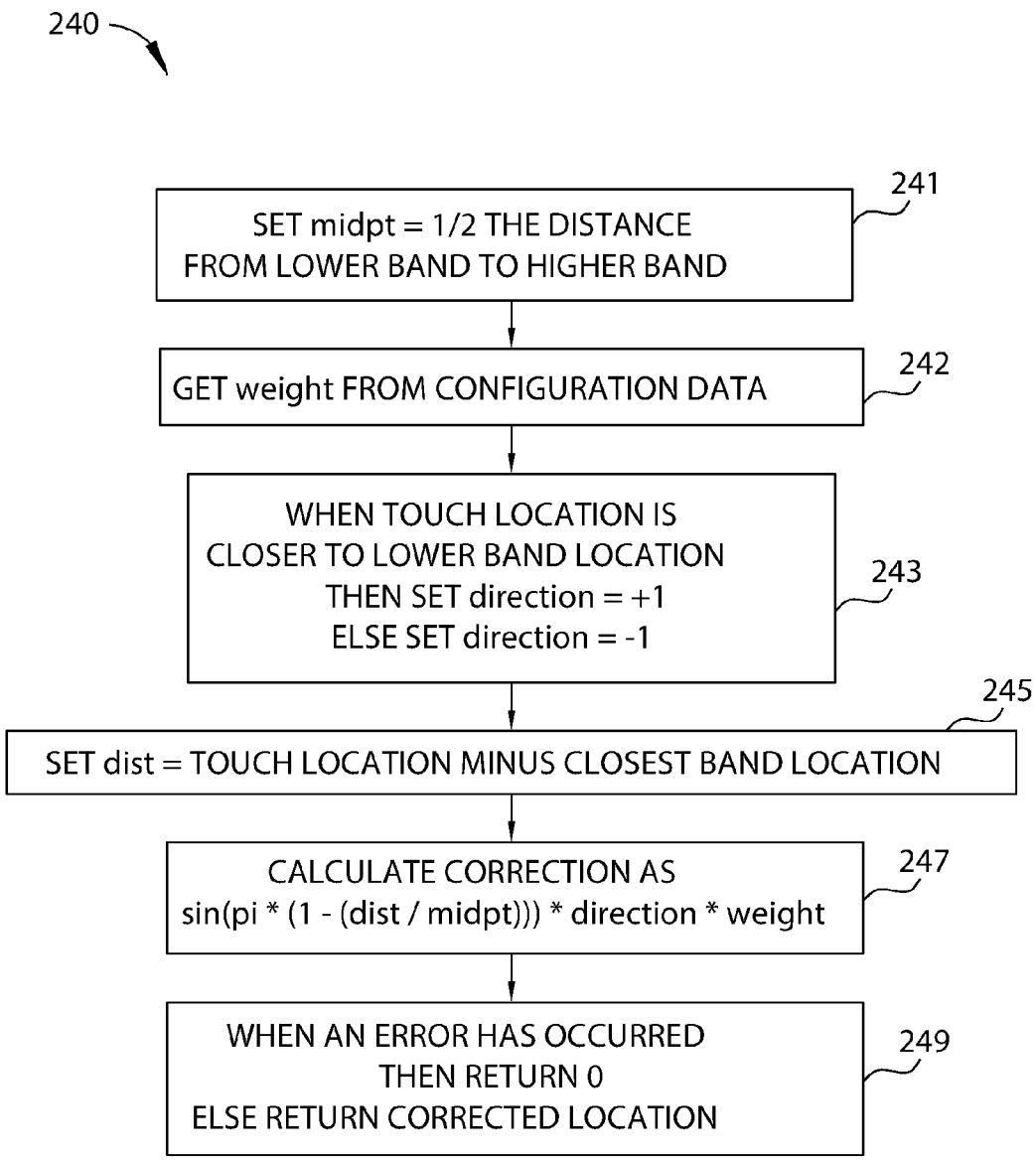
FIG. 8 is a flowchart of a detail of an embodiment of a corrector method for screen banding location correction.
Figure 10A:
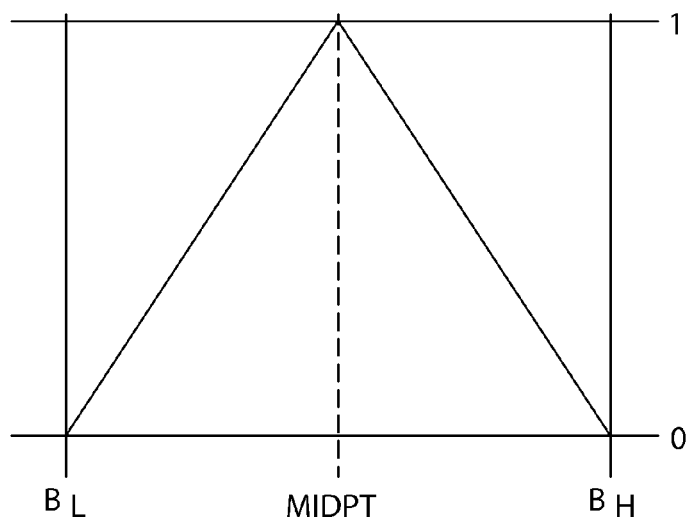
FIGS. 10A, 10B, and 10C are graphs illustrating details of an embodiment of a corrector method for screen banding location correction.
Figure 10B:
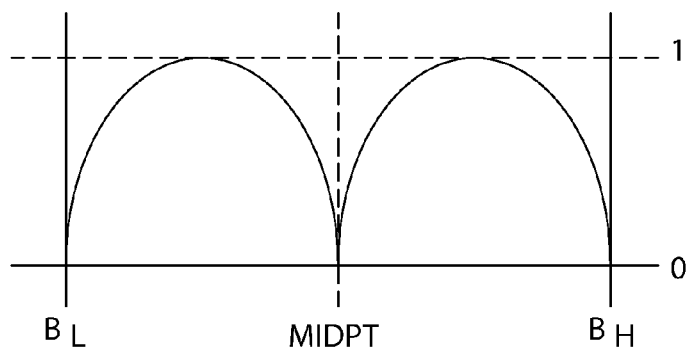
Figure 10C:
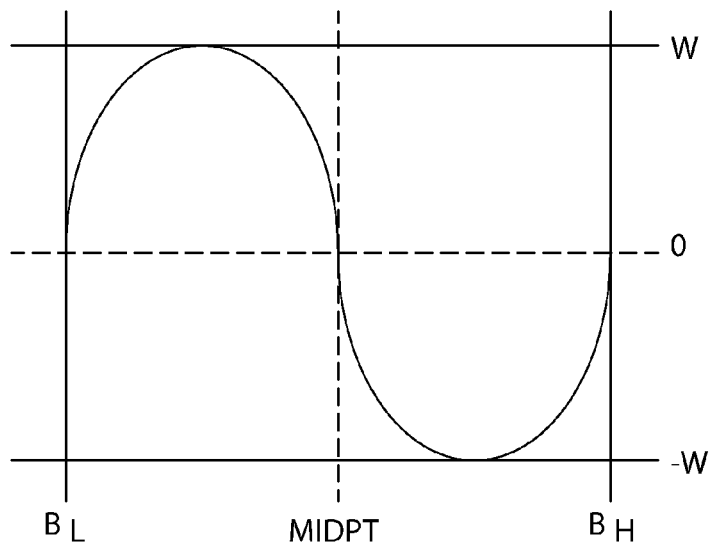

Refer now to FIG. 8, a flowchart of a detail of an embodiment of a corrector method for screen banding location correction, and FIGS. 10A-C, three graphs illustrating details of an embodiment of a corrector method for screen banding location correction. FIG. 8 details an embodiment of block 240, where the correction is determined. At block 241, the distance between the closest band B' and next-closest band B" is calculated and divided by two (2.0) to give a midpoint distance MIDPT:

$$|B'-B''|/2$$

the absolute value of the difference of the closest and next-closest band locations divided by two.

At block 242, a weighting factor W is determined from the configuration parameters (selected in block 62, and used to initialize the corrector in block 64), and the method proceeds to block 243. In block 243, the direction of the correction is determined; when the location LOC is closer to the lower band, then the direction DIR is set to +1, else the direction DIR is set to −1; after completing block 243, the method proceeds to block 245. At block 245, the distance from the closest band to the touch location is determined in DIST and the method proceeds to block 247. At block 247, the correction is calculated by multiplying the weighting factor W by the direction DIR by the sine of pi times (1−DIST/MIDPT); the formula:

$$\text{correction} = DIR * W * \sin(pi * (1-(DIST/MIDPT)))$$

After completing block 247, the method proceeds to block 249. In block 249, when the result of the correction is an error (e.g., NaN), then the correction is set to zero, else the method returns the correction.

Optionally, in some embodiments, when in block 245 the value of DIST is zero, then the method sets the correction to zero and the method ends. Optionally, the correction may be implemented differently, for example with a formula of:

$$DIR * W * \sin(pi \times ((B'+B''-(2 \times LOC))/(|B'-B''|)))$$

where B' and B" are the closest and second-closest bands, LOC is the location, DIR is the direction, and W is the weighting factor. This formula is identical in result to the previously given formula, and is derived through cancellation of terms and observation of how the sine function behaves.

Referring to FIGS. 10A-C, FIG. 10A shows a graph of the function (1−(dist/midpt)) between the lower band BL and the higher band BH. FIG. 10B shows a graph of the function sin(pi*(1−(dist/midpt))) between the lower band BL and the higher band BH. FIG. 10C shows a graph of the function d*weight*sin(pi*(1−(dist/midpt))) between the lower band BL and the higher band BH. In these, BL refers to the lower of B' and B", i.e., min(B',B"), and BH refers to the higher of B' and B", i.e., max(B',B"). FIG. 10C thus shows the relative corrections to be applied, while FIG. 10A and FIG. 10B show interim steps. The correction is zero when directly over a band and when directly over the midpoint between bands, while it peaks at ¼ and ¾ of the distance between bands. The sign of the correction changes depending on which band (higher or lower) that the location is closer to.

What is claimed is:

1. A method for determining correction for a touch location on a touchscreen, the method comprising:
    selecting a first band location from a plurality of band locations;
    selecting a second band location from the plurality of band locations; and
    determining the correction from the touch location, the first band location, and the second band location,
    wherein determining the correction comprises applying a trigonometric function to a value, wherein the trigonometric function is sine and the value is:

$$\pi \times ((B_1+B_2-(2 \times L))/(|B1-B2|))$$

where $B_1$, is the first band location, and where
    $B_2$ is the second band location, and
    where L is the touch location.

2. The method of claim 1, further comprising:
    correcting the touch location by applying the correction to the touch location.

3. The method of claim 1, wherein the first band location is selected such that the first band location is a closest band location to the touch location.

4. The method of claim 3, wherein the second band location is selected such that the second band location is a second closest band location to the touch location.

5. The method of claim 3, wherein the second band location is selected such that the second band location is adjacent to the first band location and the touch location is between the first band location and the second band location.

6. The method of claim 3, wherein when the touch location is exactly on the first band location, then the second band location is selected such that the second band location is adjacent to the first band location.

7. A computer system comprising: one or more processors; a non-transitory computer readable medium operatively coupled to the one or more processors; and logic stored in the computer readable medium that, when executed by the one or more processors from the computer readable medium, causes the computer to determine correction for a touch location on a touchscreen by at least:

selecting a first band location from a plurality of band locations;
selecting a second band location from the plurality of band locations; and
determining the correction from the touch location, the first band location, and the second band location,
wherein determining the correction comprises applying a trigonometric function to a value, wherein the trigonometric function is sine and the value is:

$$\pi \times ((B_1+B_2-(2 \times L))/(|B1-B2|))$$

where $B_1$, is the first band location, and where
$B_2$ is the second band location, and
where L is the touch location.

8. The computer system of claim 7, the logic further comprising:
correcting the touch location by applying the correction to the touch location.

9. The computer system of claim 7, wherein the first band location is selected such that the first band location is a closest band location to the touch location.

10. The computer system of claim 9, wherein the second band location is selected such that the second band location is a second closest band location to the touch location.

11. The computer system of claim 9, wherein the second band location is selected such that the second band location is adjacent to the first band location and the touch location is between the first band location and the second band location.

12. The computer system of claim 9, wherein when the touch location is exactly on the first band location, then the second band location is selected such that the second band location is adjacent to the first band location.

13. A non-transitory computer-readable medium storing computer-readable code thereon that, when executed by a computer, causes the computer to perform operations to determine a correction for a touch location on a touchscreen by at least:

selecting a first band location from a plurality of band locations;
selecting a second band location from the plurality of band locations; and
determining the correction from the touch location, the first band location, and the second band location,
wherein determining the correction comprises applying a trigonometric function to a value, wherein the trigonometric function is sine and the value is:

$$\pi \times ((B_1+B_2-(2 \times L))/(|B1-B2|))$$

where $B_1$, is the first band location, and where
$B_2$ is the second band location, and
where L is the touch location.

14. The non-transitory computer-readable medium of claim 13, the operations further comprising:
correcting the touch location by applying the correction to the touch location.

15. The non-transitory computer-readable medium of claim 13, wherein the first band location is selected such that the first band location is a closest band location to the touch location.

16. The non-transitory computer-readable medium of claim 15, wherein the second band location is selected such that the second band location is a second closest band location to the touch location.

17. The non-transitory computer-readable medium of claim 15, wherein the second band location is selected such that the second band location is adjacent to the first band location and the touch location is between the first band location and the second band location.

18. The non-transitory computer-readable medium of claim 15, wherein when the touch location is exactly on the first band location, then the second band location is selected such that the second band location is adjacent to the first band location.

* * * * *